(12) United States Patent
Jang et al.

(10) Patent No.: US 12,348,845 B2
(45) Date of Patent: Jul. 1, 2025

(54) CAMERA MODULE

(71) Applicant: Samsung Electro-Mechanics Co., Ltd., Suwon-si (KR)

(72) Inventors: Su Bong Jang, Suwon-si (KR); Sang Jong Lee, Suwon-si (KR); Hee Soo Yoon, Suwon-si (KR); Tae Ho Yun, Suwon-si (KR); Seung Jae Song, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 106 days.

(21) Appl. No.: 17/967,973

(22) Filed: Oct. 18, 2022

(65) Prior Publication Data
US 2023/0209159 A1    Jun. 29, 2023

(30) Foreign Application Priority Data
Dec. 23, 2021 (KR) .................. 10-2021-0186210

(51) Int. Cl.
*H04N 23/54* (2023.01)
(52) U.S. Cl.
CPC .................. *H04N 23/54* (2023.01)
(58) Field of Classification Search
CPC ................................. H04N 23/54
USPC ........................................ 348/335
See application file for complete search history.

(56) References Cited

U.S. PATENT DOCUMENTS

| | | |
|---|---|---|
| 2020/0272027 A1 | 8/2020 | Kim et al. |
| 2022/0086317 A1 | 3/2022 | Paik et al. |
| 2022/0103744 A1* | 3/2022 | Hsu .............. G03B 13/36 |
| 2022/0286591 A1 | 9/2022 | Seo et al. |
| 2022/0337753 A1 | 10/2022 | Oh |

FOREIGN PATENT DOCUMENTS

| | | | |
|---|---|---|---|
| EP | 3261103 | * | 12/2017 |
| JP | 2002286133 | * | 10/2002 |
| JP | 2009141609 | * | 6/2009 |
| JP | 2010-152182 A | | 7/2010 |
| JP | WO2018008142 | * | 7/2016 |
| JP | 202286133 | * | 10/2022 |
| KR | 10-2020-0002357 A | | 1/2020 |
| KR | 10-2020-0086077 A | | 7/2020 |
| KR | 10-2020-0102236 A | | 8/2020 |
| KR | 10-2021-0026324 A | | 3/2021 |
| KR | 10-2021-0026659 A | | 3/2021 |

OTHER PUBLICATIONS

Korean Office Action issued on May 11, 2023, in counterpart Korean Patent Application No. 10-2021-0186210 (7 pages in English, 5 pages in Korean).

\* cited by examiner

*Primary Examiner* — Joel W Fosselman
(74) *Attorney, Agent, or Firm* — NSIP Law

(57) ABSTRACT

A camera module is provided. The camera module includes a fixed body which has an internal space; a first movable body movably disposed on the fixed body; a substrate disposed on the first movable body, and on which an image sensor is mounted; a yoke disposed on one of the fixed body and the first movable body; a coil disposed on the other of the fixed body and the first movable body, and disposed to face the yoke; and an elastic member connected to the fixed body and the first movable body, and configured to provide a restorative force to the first movable body.

19 Claims, 18 Drawing Sheets

CAMERA MODULE

CROSS-REFERENCE TO RELATED APPLICATIONS

This application claims benefit under 35 USC § 119(a) of Korean Patent Application No. 10-2021-0186210 filed on Dec. 23, 2021, in the Korean Intellectual Property Office, the entire disclosure of which is incorporated herein by reference for all purposes.

BACKGROUND

1. Field

The following description relates to a camera module.

2. Description of Related Art

A camera module is a miniature camera mounted on devices, such as, but not limited to, a mobile phone, laptop, webcam, or the like. Although picture quality is inferior compared to that of digital single-lens reflex (DSLR) cameras, such a camera module has gained popularity due to the advantage of allowing a user to instantaneously take pictures anywhere. Currently, all mobile phones have built-in cameras. Additionally, the picture quality of mobile phone cameras has been continuously improved. Accordingly, various functions or operations such as autofocus (AF), optical image stabilization (OIS), flash, and the like, are implemented in the camera module as well as the implementation of high-pixel image sensors.

Meanwhile, to implement the autofocus (AF) operation and the optical image stabilizer (OIS) operation, an actuator that performs autofocus and an actuator that performs optical image stabilization (OIS) are being implemented. The actuator has a structure in which a coil is disposed in an external case and a permanent magnet is disposed in an internal lens driving unit (e.g., a barrel).

The actuator that performs an AF operation may have a structure to drive the lens barrel upwardly and downwardly by generating electromagnetic force through an interaction between an internal permanent magnet and the outer coil. A yoke is attached to an external surface of the coil to increase the generated force and prevent external magnetic flux leakage. However, the actuator for OIS also has a coil and a permanent magnet disposed similarly to the actuator for AF, but unlike the actuator that performs the AF operation, the actuator is driven back and forth and a yoke is not provided on the outside of the coil. Thereby, whenever the actuator that performs OIS is driven, there is a problem in that magnetic flux may be leaked externally.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a camera module includes a fixed body which has an internal space; a first movable body movably disposed on the fixed body; a substrate disposed on the first movable body, and on which an image sensor is mounted; a yoke disposed on one of the fixed body and the first movable body; a coil disposed on the other of the fixed body and the first movable body, and disposed to face the yoke; and an elastic member connected to the fixed body and the first movable body and configured to provide a restorative force to the first movable body.

The yoke includes four pairs of yokes which are installed on the fixed body and the first movable body, and the coil is installed on a yoke of each pair of the four pairs of yokes.

A sidewall of the fixed body and a sidewall of the first movable body may have a rectangular frame shape as viewed from above, and wherein the yoke may be installed on an internal surface of the sidewall of the fixed body.

The elastic member may be disposed below the yoke and the coil.

The elastic member may be connected to a surface on which the yoke is installed.

The fixed body and the first movable body may be configured to have an octagonal frame shape when viewed from above, and the yoke and the coil may oppose each other in a diagonal direction of the image sensor.

The yoke may be installed on an internal surface of a sidewall of the fixed body, and the elastic member may be disposed on a surface adjacent to the surface on which the yoke is installed.

The elastic member and the yoke may be disposed adjacent to each other.

A sidewall of the fixed body may be configured to have a rectangular frame shape when viewed from above, and the fixed body is configured to have an installation portion disposed on each of four edges of the fixed body, a sidewall of the first movable body may be configured to have an octagonal frame shape when viewed from above, and the yoke may be installed on the installation portion of the fixed body.

The elastic member may be connected to an internal surface of the sidewall of the fixed body, and an external surface of the sidewall of the first movable body, wherein the elastic member and the yoke may be alternately disposed.

The elastic member may be formed of a leaf spring.

The camera module may include a ball member disposed on the fixed body and the first movable body.

A groove in which the ball member is installed may be respectively provided on a surface of the fixed body and a surface of the first movable body facing each other, and the groove provided on the surface of the fixed body and the groove provided on a surface of the first movable body extend in a direction intersecting each other.

The yoke may be comprised of a soft magnetic material that is magnetized by a magnetic field of the coil.

The coil may be installed on a yoke which is installed on the fixed body.

The coil may be installed on a yoke which is installed on the first movable body.

In a general aspect, an apparatus includes a camera module including an actuator configured to move an image sensor in a direction perpendicular to an optical axis; a fixed body; and a movable body, configured to move the image sensor; wherein the actuator includes first yokes disposed on an inner wall of the fixed body and second yokes disposed on an outer wall of the movable body, the first yokes facing the second yokes, a coil disposed on one of the first yokes and the second yokes, and disposed to face the other of the first yokes and the second yokes; and an elastic member, connected to the inner wall of the fixed body and the outer wall of the movable body, wherein the elastic member is configured to provide a force to the movable body.

The apparatus may further include a ball member, configured to support the image sensor, and disposed on a surface of the fixed body and a surface of the movable body.

The elastic member may be disposed adjacent to the yoke.

The elastic member may be a spring.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
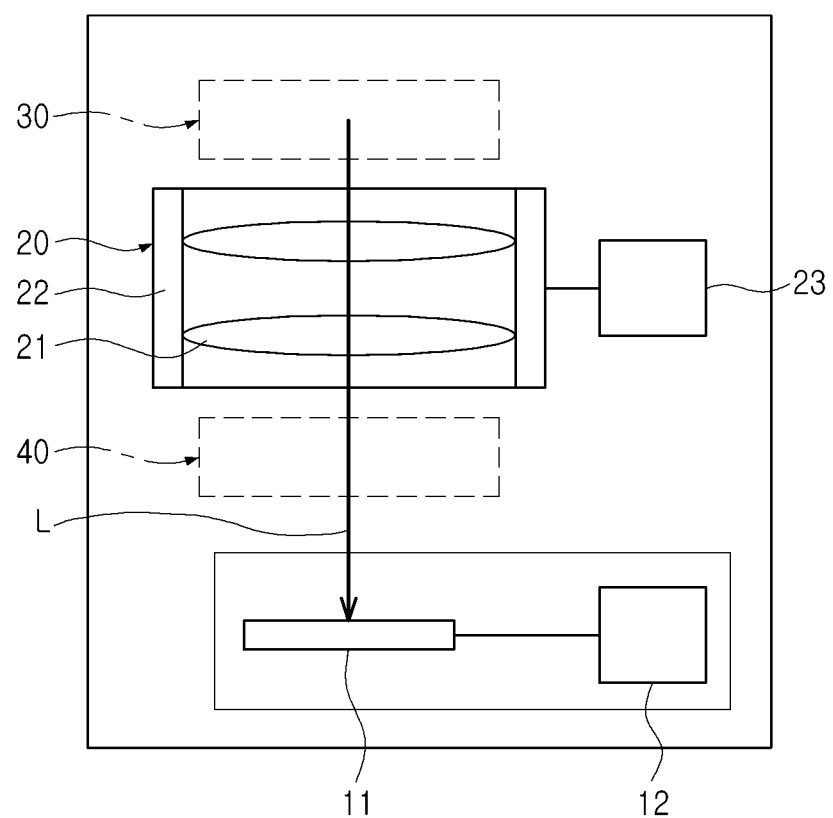
FIG. 1 is a configuration diagram schematically illustrating components constituting an example camera module, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

One or more examples provide a camera module that prevents magnetic flux from leaking.

FIG. 1 is a configuration diagram schematically illustrating components constituting an example camera module, in accordance with one or more embodiments.

Referring to FIG. 1, in an example embodiment, a camera module 10 includes a lens module 20 including at least one lens 21 and a lens barrel 22 accommodating at least one lens 21, and an image sensor 11. Light L passes through the lens module 20 and is in contact with an imaging surface of the image sensor 11. The camera module 10 may include an AF driving unit 23 that moves or drives the lens module 20 in an optical axis direction to adjust a focal length.

In an embodiment, the camera module 10 may provide an optical image stabilization (hereinafter, referred to as 'OIS') function or operation. The camera module 10 may provide an OIS function by driving the image sensor 11. For example, the camera module 10 may include an OIS driving unit 12 that moves or drives the image sensor 11 in a direction, perpendicular to an optical axis, or rotates the image sensor 11 about an axis, parallel to the optical axis or rotates the image sensor 11 about an axis, perpendicular to the optical axis.

In an embodiment, the camera module 10 may further include an optical element in addition to the lens module 20 and the image sensor 11. In an embodiment, the camera module 10 may include two or more lens modules. In an example, the first optical element 30 and/or the second optical element 40 may be an additional lens module, separate from the lens module 20.

In an embodiment, the camera module 10 may include an optical path conversion element disposed in front of the lens module 20. In an example, the first optical element 30 may be a prism or a mirror. In another embodiment, the optical path conversion element may be disposed between the image sensor 11 and the lens module 20. In an example, the second optical element 40 may be a prism or a mirror, as only examples.

Figure 2:
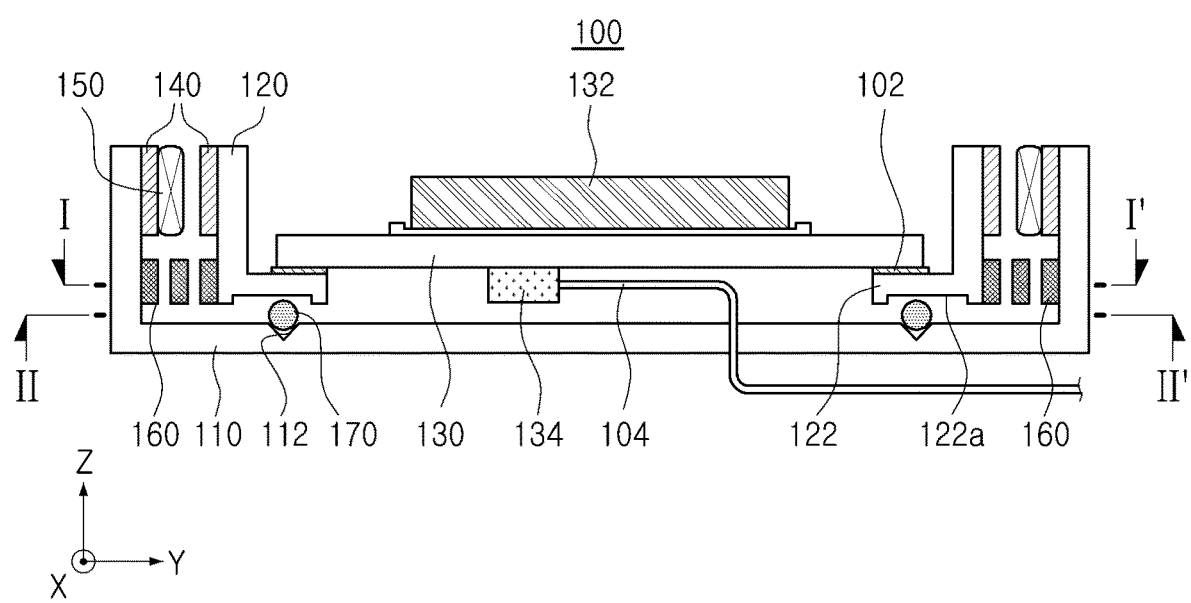
FIG. 2 is a configuration diagram illustrating a main configuration disposed at a lower end of the example camera module according to a modified embodiment as viewed from above.
Figure 3:
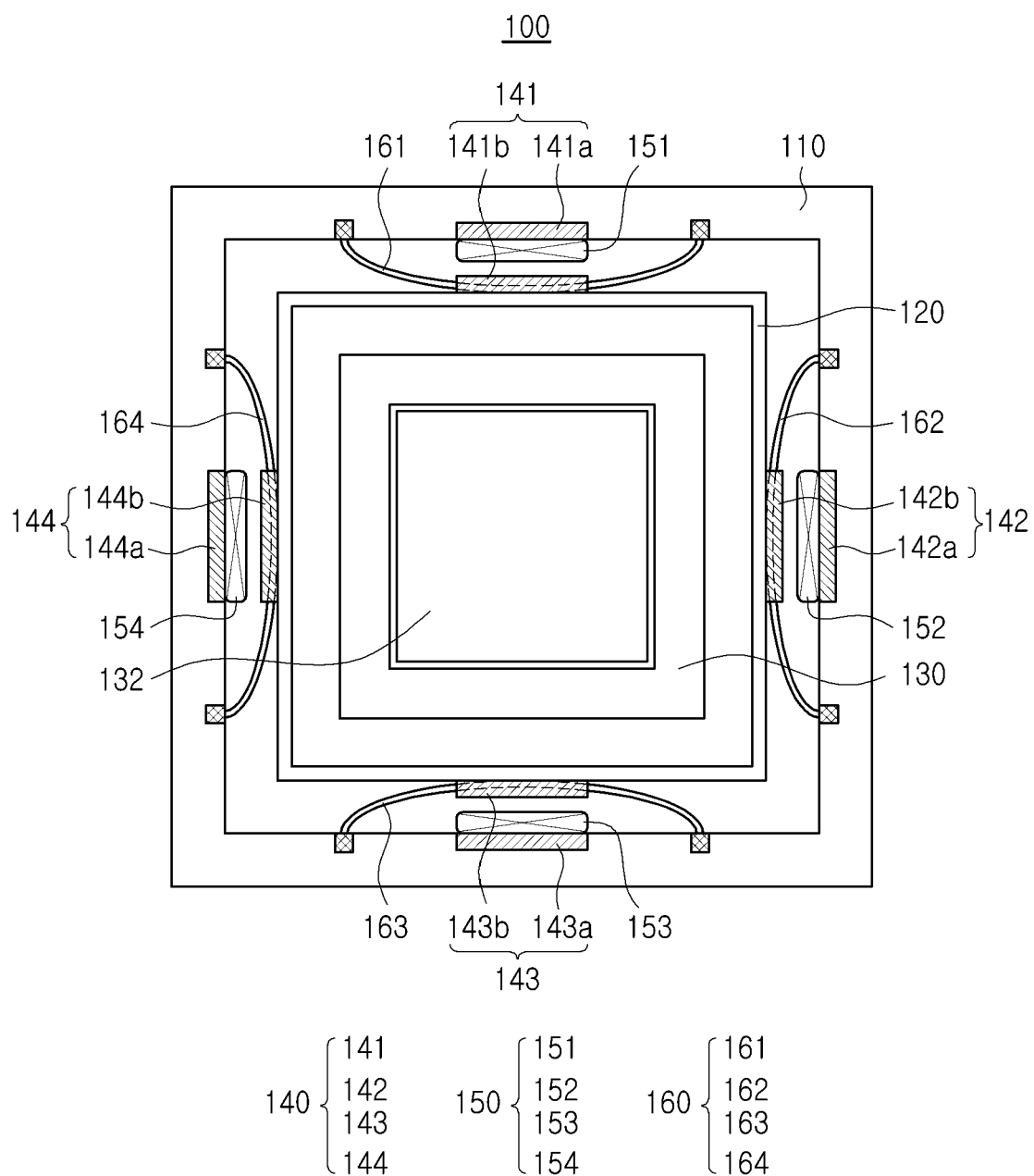
FIG. 3 is a plan view of FIG. 2 as viewed from above.
Figure 4:
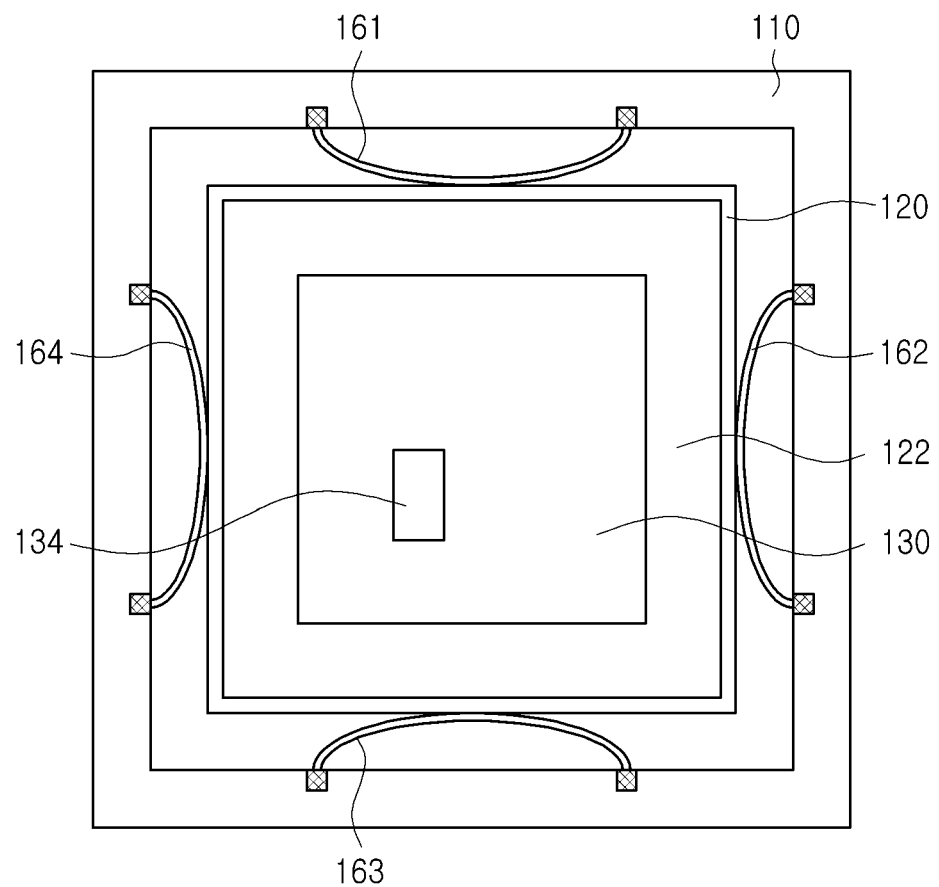
FIG. 4 is a cross-sectional view taken along line I-I' of FIG. 2.
Figure 5:
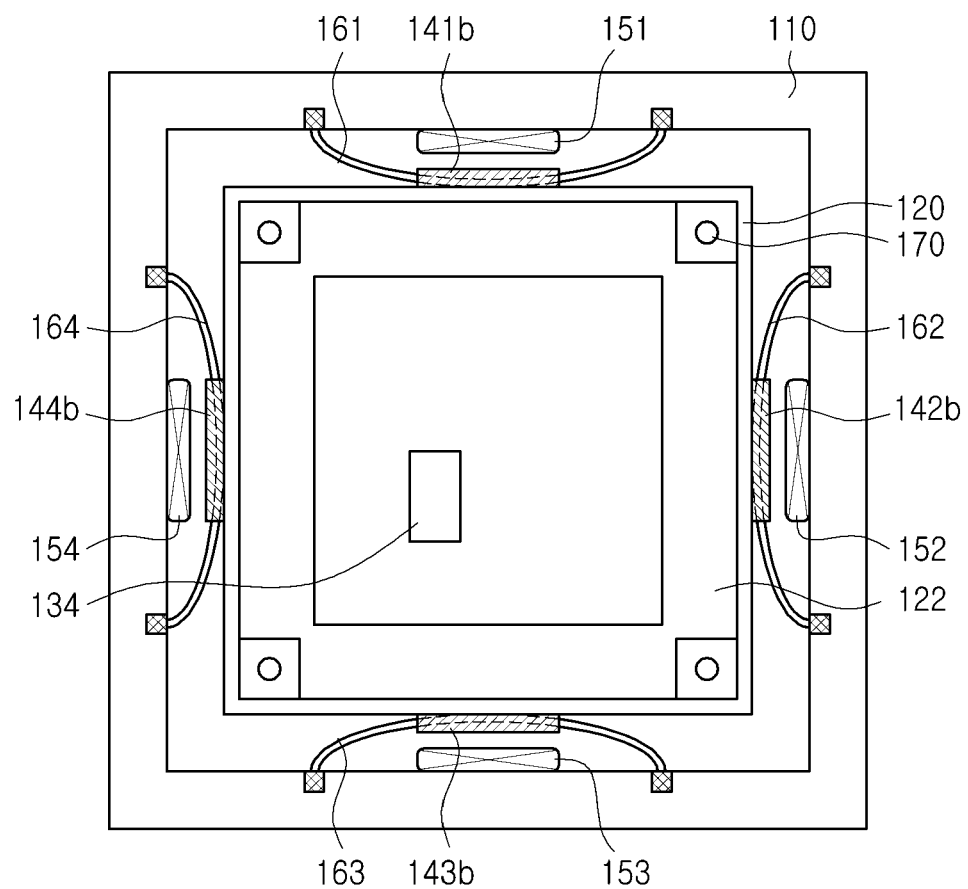
FIG. 5 is a cross-sectional view taken along line II-II' of FIG. 2.

FIG. 2 is a configuration diagram illustrating a main configuration disposed at a lower end of the example camera module, in accordance with one or more embodiments, FIG. 3 is a plan view of FIG. 2 as viewed from above, FIG. 4 is a cross-sectional view taken along the line I-I' in FIG. 2, and FIG. 5 is a cross-sectional view taken along the line II-II' of FIG. 2.

Referring to FIGS. 2 to 5, as an example, the camera module 100 may include a fixed body 110, a first movable body 120, a substrate 130, a yoke 140, a coil 150, an elastic member 160, and a ball member 170.

The fixed body 110 has an internal space. In an example, the fixed body 110 may have a rectangular parallelepiped shape with an open upper portion. That is, a sidewall of the fixed body 110 may have a rectangular frame shape as viewed from above. In an example, a yoke 140 may be installed on the fixed body 110. A coil 150 may be fixedly installed on the yoke 140 installed on the fixed body 110. A detailed description thereof will be provided later. Additionally, an elastic member 160 may be connected to an internal surface of the sidewall of the fixed body 110. In this example, the elastic member 160 may be disposed below the yoke 140 disposed on the fixed body 110. A detailed description thereof will also be provided later. Additionally, a first groove 112 in which the ball member 170 is installed may be provided on a bottom surface of the internal surface of the fixed body 110.

The first movable body 120 is movably installed on the fixed body 110. In an example, a sidewall of the first movable body 120 may have a rectangular frame shape as viewed from above. In an example, the first movable body 120 may include a support frame 122 that is formed to extend inwardly from a lower end portion and may include a support frame 122 to install or support the substrate 130.

In an example, a bottom surface of the support frame 122 may be provided with a second groove 122a in which the ball member 170 is installed. That is, the ball member 170 may be disposed between the first groove 112 of the fixed body 110 and the second groove 122a of the support frame 122. Accordingly, when the first movable body 120 is moved within the fixed body 110, the first movable body 120 may be guided by the ball member 170 so that the first movable body 120 can move more smoothly.

The first groove 112 and the second groove 122a may have a shape having a length in a direction intersecting each other. For example, the first groove 112 may be formed to extend in a direction parallel to an imaging surface of the image sensor 132, and the second groove 122a may also be formed to extend in a direction parallel to the imaging surface of the image sensor 132. In an example, a direction in which the first groove 112 extends and a direction in which the second groove 122a extends may cross each other.

In an embodiment, the first groove 112 may have a length in a first direction (X-direction), and the second groove 122a may have a length in a second direction (Y-direction). The first direction (X-direction) and the second direction (Y-direction) may be directions that are perpendicular to each other on a plane parallel to the imaging surface of the image sensor 132.

As another embodiment, both the first groove 112 and the second groove 122a may have a shape that does not restrict a rolling direction of the ball member 170. For example, the first groove 112 and the second groove 122a may have a polygonal or circular shape having a size larger than the diameter of the ball member 170.

As another embodiment, the first groove 112 may have a shape making three-point contact with the ball member 170 so that the ball member 170 rotates in place, and the second groove 122a may have a polygonal or circular shape having a size larger than a diameter of the ball member 170.

In an example, a yoke 140 may be installed on an external surface of a sidewall of the first movable body 120 to face the yoke 140 installed on the fixed body 110. A detailed description thereof will be provided later.

Additionally, an elastic member 160 may be connected to the external surface of the sidewall of the first movable body 120. In this example, the elastic member 160 may be disposed below the yoke 140 disposed on the fixed body 110. A detailed description thereof will also be provided later.

The substrate 130 is installed on the first movable body 120, and the image sensor 132 is mounted on an upper surface of the substrate 130. In an example, the substrate 130 may be fixedly installed on an upper surface of the support frame 122 of the first movable body 120 via an adhesive 102. In an example, a connector 134, that enables connection with a flexible circuit board 104, may be provided on a bottom surface of the substrate 130.

The yoke 140 is disposed on one of the fixed body 110 and the first movable body 120, and the coil 150 is disposed on the other of the fixed body 110 and the first movable body 120. Additionally, a yoke 140 may be additionally disposed on a member on which the coil 150 is disposed among the fixed body 110 and the first movable body 120 to focus a magnetic field of the coil 150.

In the following description, it is illustrated that the yoke 140 is installed in each of the fixed body 110 and the first movable body 120, and the coil 150 is disposed to face any one of the two yokes 140 at an interval, but an embodiment is not limited thereto.

The yokes 140 may be installed on the fixed body 110 and the first movable body 120 to face each other. As an example, the four pairs of yokes 140 may be installed on the fixed body 110 and the first movable body 120. For example, referring to FIG. 3, the yoke 140 may include a first yoke 141 installed on an internal surface of one sidewall of the fixed body 110 and an external surface of the first movable body 120 disposed opposite thereto, and the first yoke 141 may include a 1-1 yoke 141a installed on the internal surface of one sidewall of the fixed body 110 and a 1-2 yoke 141b disposed opposite thereto. In addition, the yoke 140 may include a second yoke 142 installed on an internal surface of a sidewall, disposed adjacent to one sidewall of the fixed body 110 and an external surface of the first movable body 120, disposed opposite thereto, and the second yoke 142 may include a 2-1 yoke 142a installed on the internal surface of the fixed body 110, and a 2-2 yoke 142b disposed opposite thereto. Furthermore, the yoke 140 may include a third yoke 143 installed on an internal surface of a sidewall, disposed opposite to one sidewall of the fixed body 110 and an external surface of the first movable body 120 disposed opposite thereto, and the third yoke 143 may include a 3-1 yoke 143a installed on the internal surface of the fixed body 110 and a 3-2 yoke 143b disposed opposite thereto. Meanwhile, the yoke 140 may include a fourth yoke 144 installed on an internal surface of a sidewall, disposed adjacent to one sidewall of the fixed body 110 and an external surface of the first movable body 120 disposed opposite thereto, and the fourth yoke 144 may include a 4-1 yoke 144a installed on the internal surface of the fixed body 110 and a 4-2 yoke 144b disposed opposite thereto.

In other words, the yoke 140 may include first to fourth yokes 141, 142, 143, and 144, and the first to fourth yokes 141, 142, 143, and 144 may be disposed so that two thereof form a pair.

The coil 150 is installed on the yoke 140 installed on an internal surface of the fixed body 110. As an example, the coil 150 is installed on a 1-1 yoke 141a, a 2-1 yoke 142a, a 3-1 yoke 143a, and a 4-1 yoke 144a, installed on the internal surface of the fixed body 110, among the first to fourth yokes 141, 142, 143, and 144. That is, the coil 150 may include a first coil 151 installed on the 1-1 yoke 141a, a second coil 152 installed on the 2-1 yoke 142a, a third coil 153 installed on the 3-1 yoke 143a, and a fourth coil 154 installed on the 4-1 yoke 144a. When power is supplied to the coil 150, the first movable body 120 is moved in the internal space of the fixed body 110 by force (reluctance force) generated from the coil 150 and the yoke 140 formed of a magnetic material.

In an embodiment, when no current flows in the coil 150, a magnetic field due to the yoke 140 may be zero or a very small level. Accordingly, it is possible to prevent or minimize the effect of the magnetic field caused by the yoke 140 from affecting other electronic components (e.g., other electronic components inside the camera module or electronic components inside other camera modules).

In an embodiment, the yoke 140 may be a soft magnetic material. The soft magnetic material has small coercive force and is magnetized when exposed to a magnetic field, but loses magnetism when the magnetic field disappears or has a relatively low level of magnetism.

When current is applied to the coil 150, the yoke 140 is magnetized, thereby generating reluctance force between the coil unit 150 and the yoke 140. Attractive force is generated between the yoke 140 and the coil 150 in a direction facing each other at an interval, which causes the first movable body 120 to move in the corresponding direction with respect to the fixed body 130.

The elastic member 160 is connected to the fixed body 110 and the first movable body 120 to provide restorative force to the first movable body 120. In an example, the elastic member 160 is connected to the fixed body 110 and the first movable body 120 so as to be disposed below the coil 150 and the yoke 140. For example, the elastic member 160 may include a first elastic member 161 disposed below the first yoke 141 and the first coil 151, a second elastic member 162 disposed below the first yoke 142 and the first coil 152, a third elastic member 163 disposed below the third yoke 143 and the third coil 153, and a fourth elastic member 164 disposed below the fourth yoke 144 and the fourth coil 154. In addition, as an example, the elastic member 160 may have both end portions connected to the fixed body 110 and a central portion connected to the first movable body 120.

In an example, the first to fourth elastic members 161 to 164 may provide a restorative force to return the first movable body 120 to an original position thereof when current supplied to the coil 150 is cut off. For example, the elastic member 160 may be formed of a leaf spring.

The ball member 170 is disposed between the fixed body 110 and a bottom surface of the first movable body 120. In an example, the ball 170 is disposed between the first groove 112 of the fixed body 110 and the second groove 122a of the first movable body 120. In an example, four ball members 170 may be disposed on a side of an edge of the first movable body 120. However, is the one or more examples are not limited thereto, and the number and installation positions of the ball members 170 may be changed.

Since the first groove 112 has a length in a first direction, the ball member 170 may roll along the first groove 112 in the first direction. Since the second groove 122a has a length in a second direction, the ball member 170 may roll in the second direction along the second groove 122a.

Both the first direction and the second direction are directions, parallel to an imaging surface of the image sensor 132 (e.g., a direction, perpendicular to an optical axis), and may be directions, perpendicular to each other.

Accordingly, the first movable body 120 may move in the first direction and the second direction.

As described above, in the camera module 100, a method for driving the first movable body 120 using the force (reluctance force) generated by the yoke 140 and the coil 150 and the restorative force of the elastic member 160 formed of a leaf spring is adopted. That is, when current is applied to the coil 150 installed on the fixed body 110, a magnetic field is formed in the coil 150, and the formed magnetic field generates reluctance force together with the yoke installed in the first movable body 120. The yoke 140 installed on the first movable body 120 is pulled through this force, and accordingly, the first movable body 120 is moved. Thereafter, when current is cut off, the elastic member 160 disposed below the yoke 140 and the coil 150 restores the first movable body 120 to an original position thereof. Accordingly, OIS driving of the image sensor 132 attached to the first movable body 120 may be performed.

As described above, since the camera module 100 does not use a permanent magnet, it is possible to remove an external interference phenomenon of the magnetic field due to the permanent magnet. Furthermore, since the coil 150 is installed on the yoke 140, there is a shielding effect against the magnetic flux leaking externally, and the reluctance force can be increased by reducing the magnetoresistance.

Hereinafter, a driving method of the camera module will be described with reference to the drawings.

FIGS. 6 to 9 are illustrative views illustrating a driving method of an example camera module, in accordance with one or more embodiments.

Figure 6:
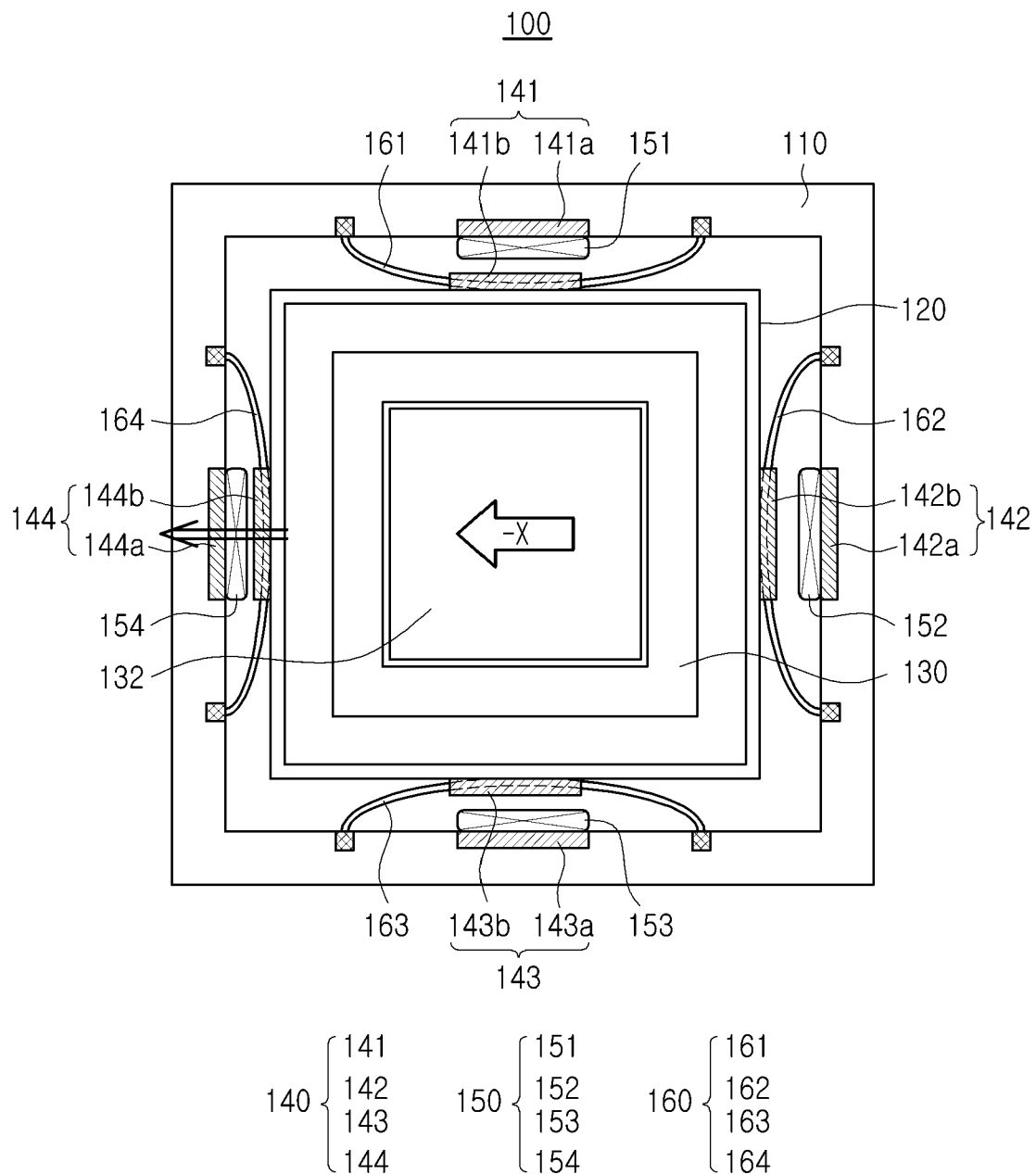
FIG. 6, FIG. 7, FIG. 8, and FIG. 9 are illustrative views illustrating a driving method of an example camera module, in accordance with one or more embodiments.

Referring to FIG. 6, when the first movable body 120 moves in an −X axis direction, current is applied to a fourth coil 154. Accordingly, the first movable body 120 may be moved in the −X axis direction through the force generated by the fourth yoke 144 and the fourth coil 154. Thereafter, when supply of current to the fourth coil 154 is cut off, the first movable body 120 returns to an original position thereof by restorative force of the fourth elastic member 164. In this example, restorative force of the first elastic member 161 and the third elastic member 163 may also be provided to the first movable body 120.

Figure 7:
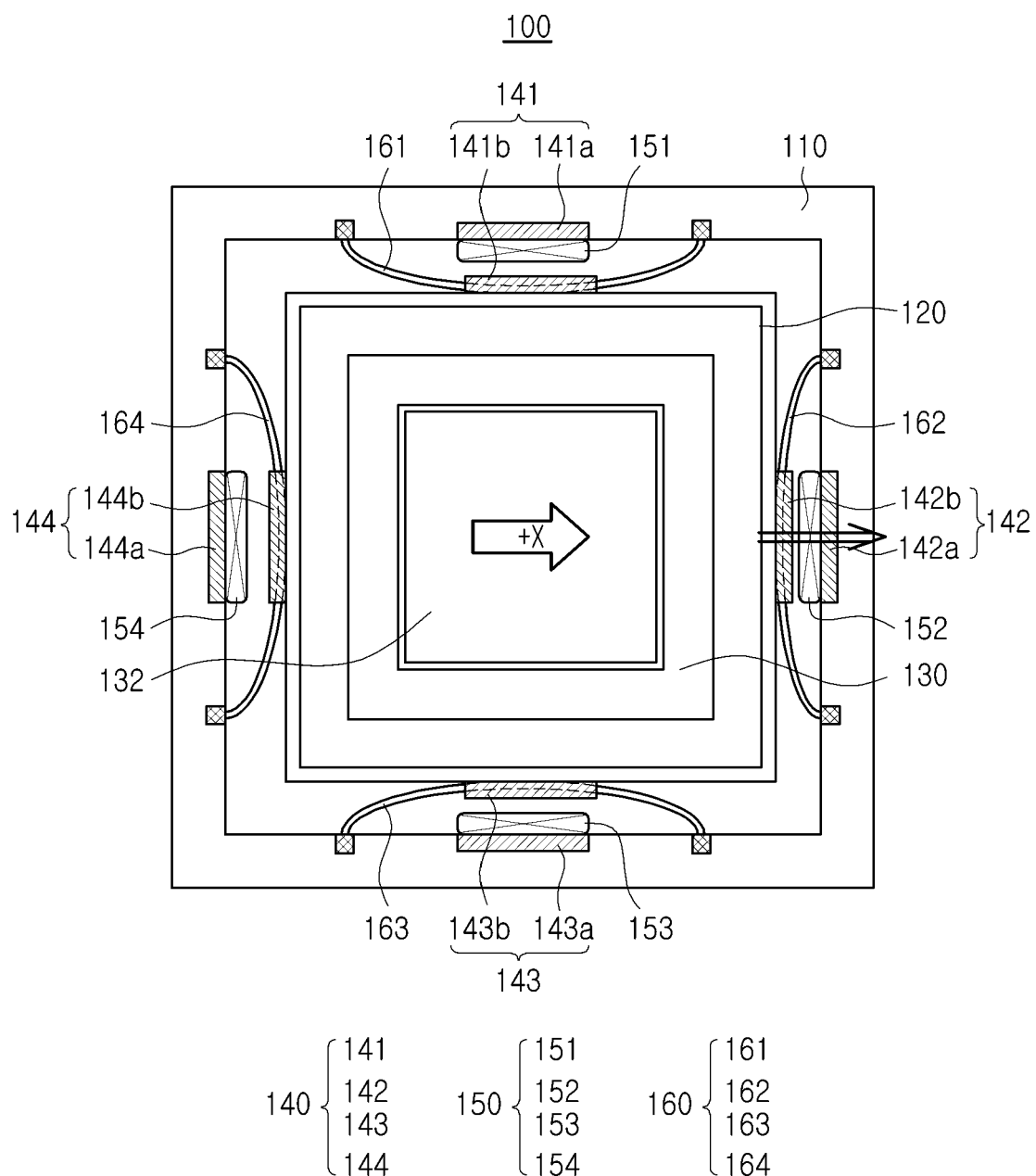

Additionally, as illustrated in FIG. 7, when the first movable body 120 moves in a +X axis direction, current is applied to the second coil 152. Accordingly, the first movable body 120 may be moved in the +X axis direction through the force generated by the second yoke 142 and the second coil 152. Thereafter, when supply of current to the second coil 152 is cut off, the first movable body 120 returns to an original position thereof by restorative force of the second elastic member 162. In this example, restorative force of the first elastic member 161 and the third elastic member 163 may also be provided to the first movable body 120.

Figure 8:
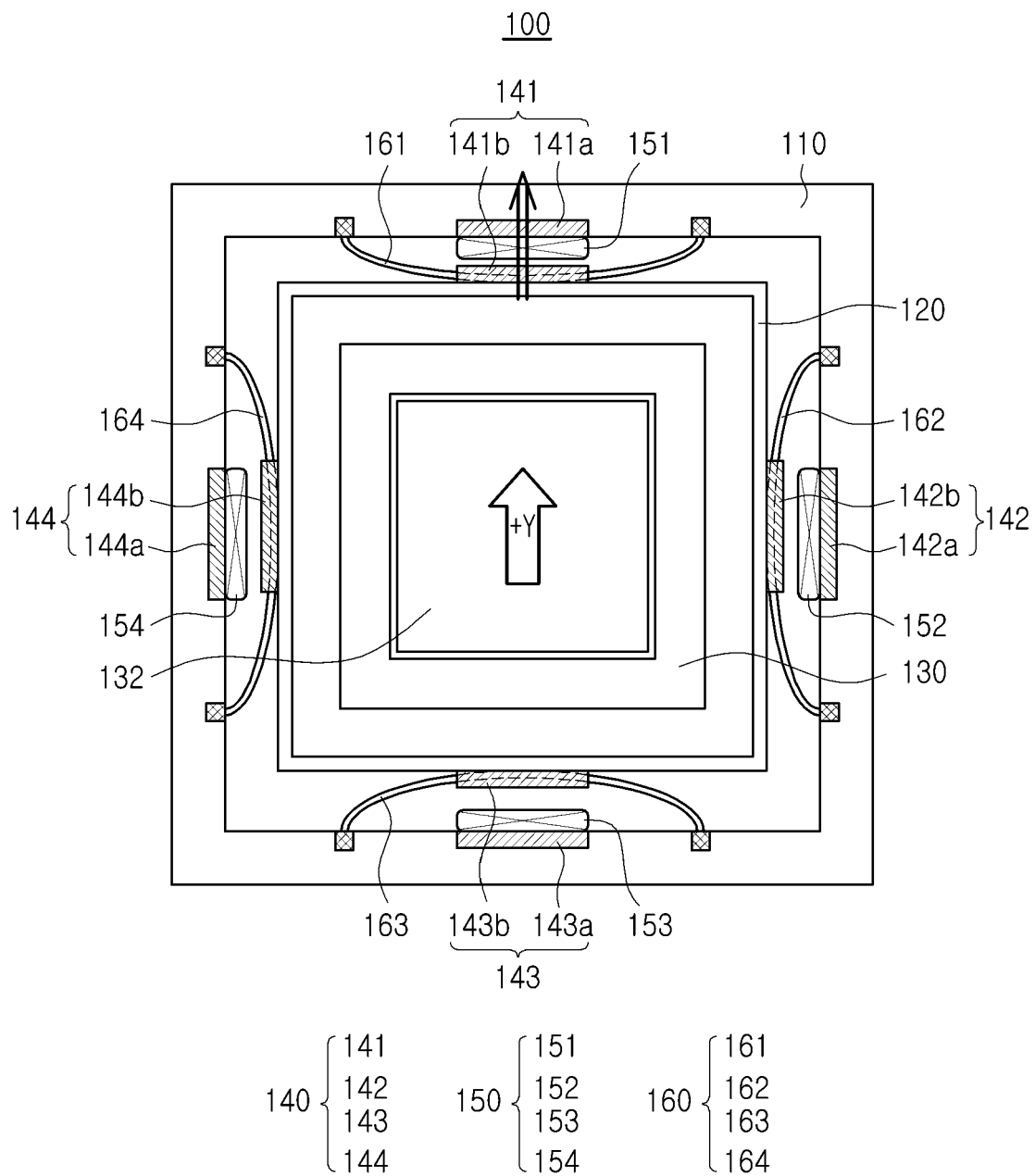

As illustrated in FIG. 8, when the first movable body 120 moves in a +Y axis direction, current is applied to the first coil 151. Accordingly, the first movable body 120 may be moved in the +Y axis direction through the force generated by the first yoke 141 and the first coil 151. Thereafter, when supply of current to the first coil 151 is cut off, the first movable body 120 returns to an original position thereof by restorative force of the first elastic member 161. In this case, restorative force of the second elastic member 162 and the fourth elastic member 164 may also be provided to the first movable body 120

Figure 9:
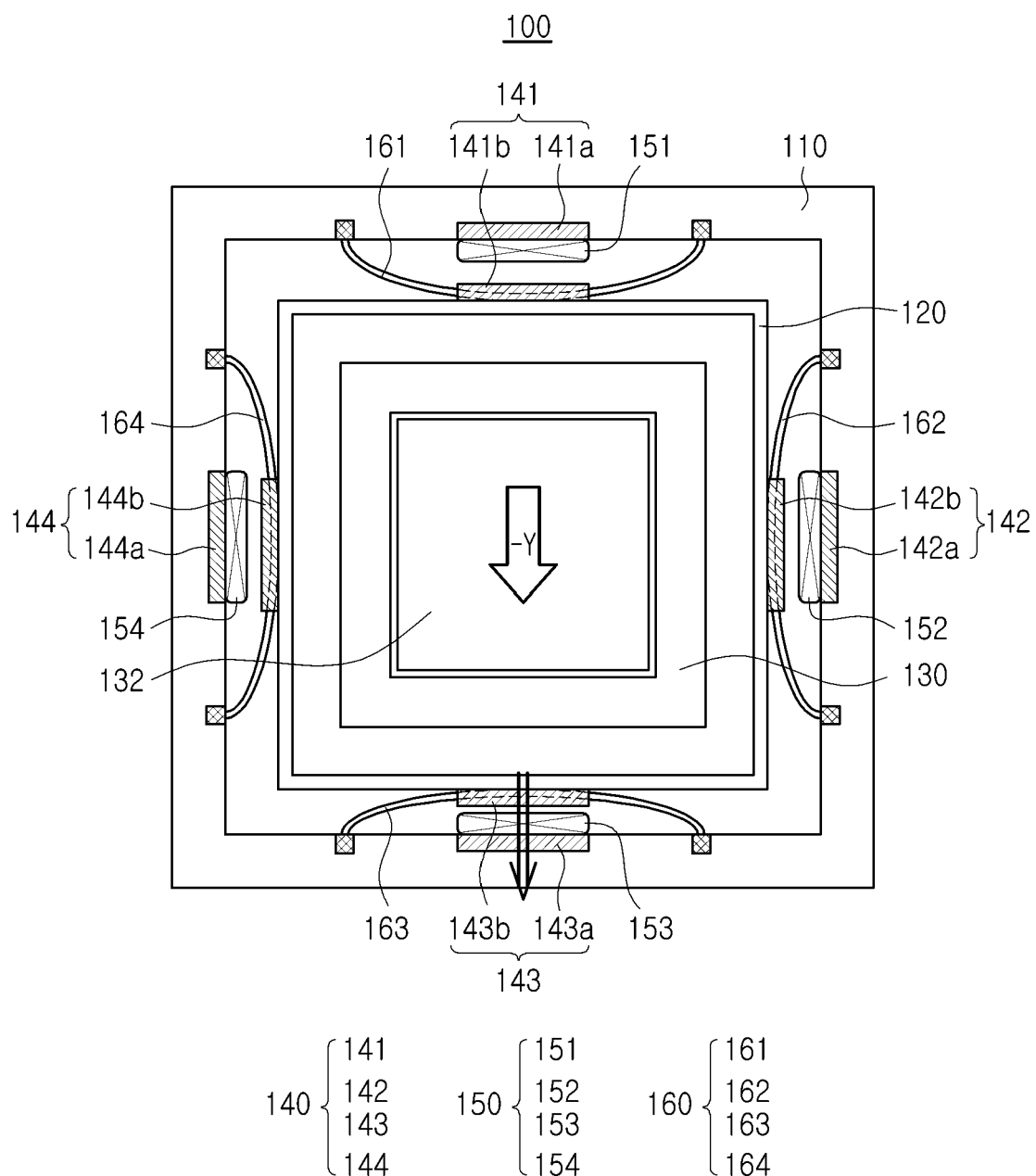

Additionally, as illustrated in FIG. 9, when the first movable body 120 moves in a −Y axis direction, current is applied to the third coil 153. Accordingly, the first movable body 120 may be moved in the −Y axis direction through the force generated by the third yoke 143 and the third coil 153. Thereafter, when supply of current to the third coil 153 is cut off, the first movable body 120 returns to an original position thereof by restorative force of the third elastic member 163. In this example, restorative force of the second elastic member 162 and the fourth elastic member 164 may also be provided to the first movable body 120.

Figure 10:
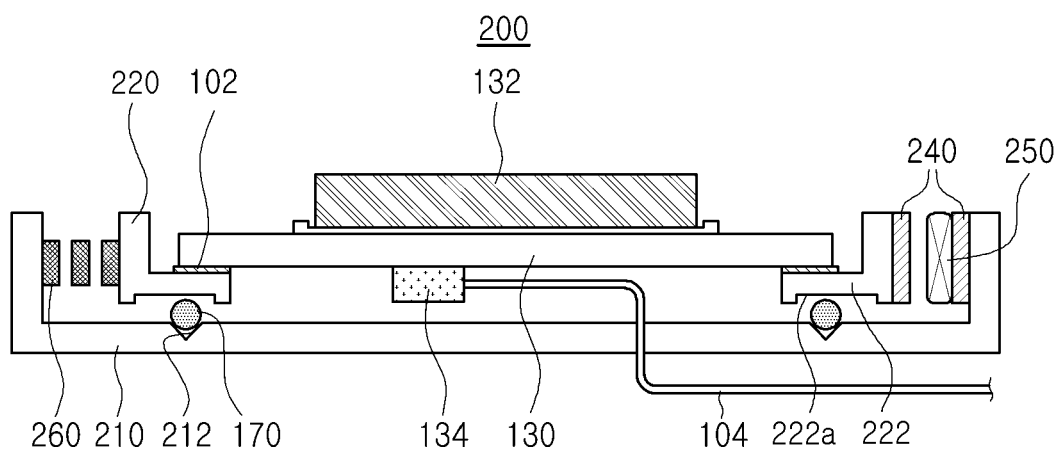
FIG. 10 is a configuration diagram illustrating a main configuration disposed at a lower end of the example camera module according to a modified embodiment as viewed from above.
Figure 11:
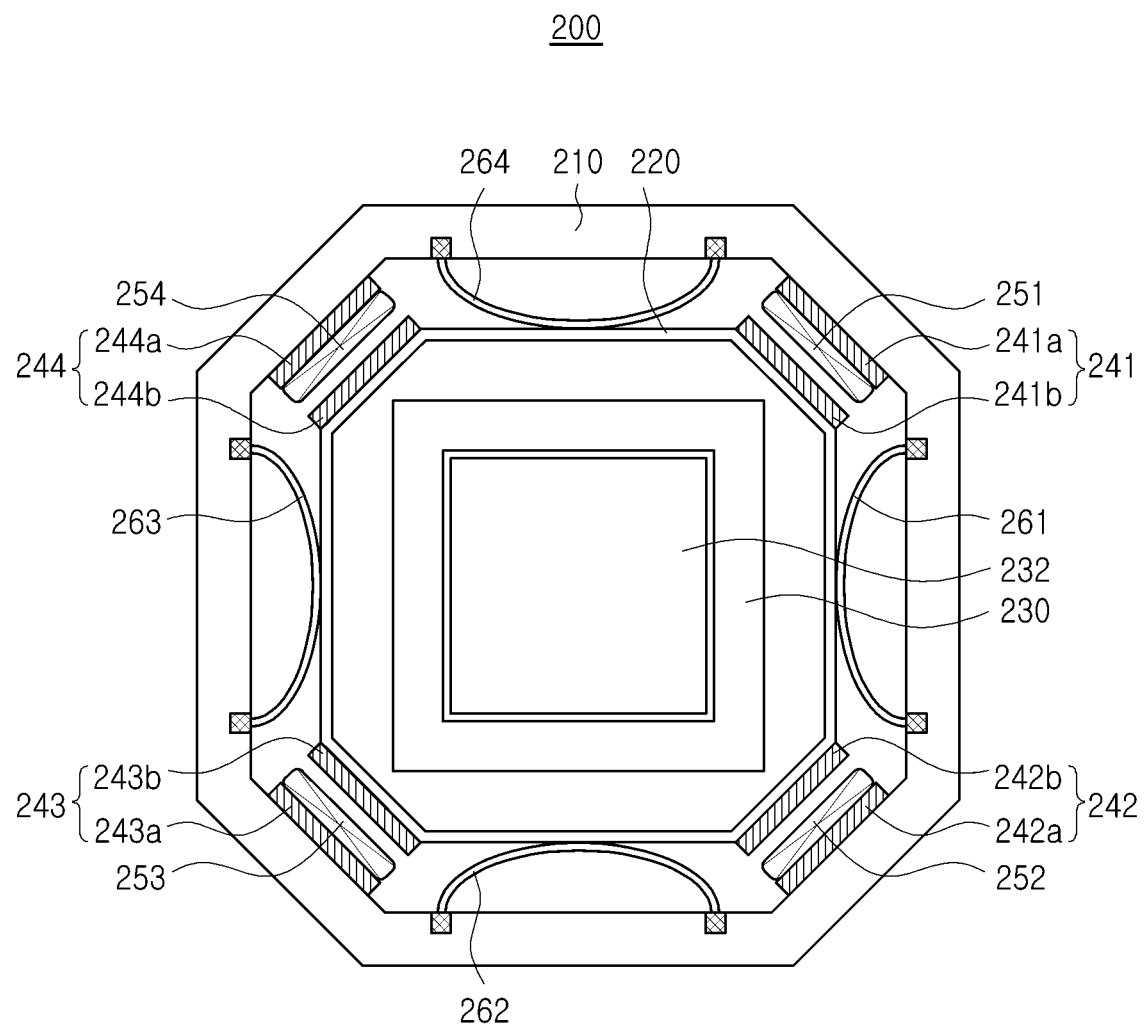
FIG. 11 is a plan view of FIG. 10 as viewed from above.

FIG. 10 is a configuration diagram illustrating a main configuration disposed at a lower end of a camera module, in accordance with one or more embodiments, and FIG. 11 is a plan view of FIG. 10 as viewed from above.

Referring to FIGS. 10 and 11, a camera module 200 may include, as an example, a fixed body 210, a first movable body 220, a substrate 130, a yoke 240, a coil 250, an elastic member 260, and a ball member 170.

In an example, since the substrate 130 and the ball member 170 are substantially the same as the components described above, a detailed description thereof will be omitted and will be replaced with the above description.

The fixed body 210 may have an internal space. In an example, the fixed body 210 may have a shape with an open upper portion. For example, a sidewall of the fixed body 210 may have an octagonal frame shape as viewed from above. In an example, a yoke 240 may be installed at a lower end of the fixed body 210. Additionally, the coil 250 may be fixedly installed on the yoke 240 installed at the lower end of the fixed body 210. A detailed description thereof will be provided later. Additionally, an elastic member 260 may be connected to an internal surface of the sidewall of the fixed body 210. In this example, the elastic member 260 may be disposed adjacent to the yoke 240. A detailed description thereof will also be provided later. A first groove 212 in which the ball member 170 is installed may be provided on a bottom surface of the internal surface of the fixed body 210.

The first movable body 220 may be movably installed on the fixed body 210. A sidewall of the first movable body 220 may have an octagonal frame shape as viewed from above. In an example, the first movable body 220 may be formed to extend inwardly from the lower end portion thereof and may include a support frame 222 support the substrate 130. In an example, a bottom surface of the support frame 222 may be provided with a second groove 222a in which the ball member 170 is installed. Accordingly, when the first movable body 220 is moved within the fixed body 210, the first movable body 220 may be moved more smoothly based on an interaction with the ball member 170.

Meanwhile, a yoke 240 may be installed on an external surface of the sidewall of the first movable body 220 to face the yoke 140 installed at a lower end of the fixed body 210. A detailed description thereof will be provided later.

Additionally, an elastic member 260 may be connected to an external surface of the sidewall of the first movable body 220. In this example, the elastic member 260 may be disposed adjacent to the yoke 240. A detailed description thereof will also be provided later.

The yoke 240 may be installed on the fixed body 210 and the first movable body 220 to face each other. In an example, four pairs of yokes 240 may be installed on the fixed body 210 and the first movable body 220. For example, the yoke 240 may include a first yoke 241 installed on an internal surface of any one sidewall among sidewalls disposed to be inclined, among eight sidewalls of the fixed body 110, as viewed from above, and an external surface of the first movable body 220 disposed opposite thereto, and the first yoke 241 may include a 1-1 yoke 241a installed on the internal surface of the fixed body 210 and a 1-2 yoke 241b disposed opposite thereto. Additionally, the yoke 240 may include a second yoke 242 installed on an internal surface of the other sidewall among sidewalls disposed to be inclined, among eight sidewalls of the fixed body 210, as viewed from above, and an external surface of the first movable body 220 disposed opposite thereto, and the second yoke 242 may include a 2-1 yoke 242a installed on the internal surface of the fixed body 210 and a 2-2 yoke 242b disposed opposite thereto. Furthermore, the yoke 240 may include a third yoke 243 installed on an internal surface of a sidewall facing any one sidewall among sidewalls, disposed to be inclined, among eight sidewalls of the fixed body 210, and an external surface of the first movable body 220 disposed opposite thereto, and the third yoke 243 may include a 3-1 yoke 243a installed on the internal surface of the fixed body 210 and a 3-2 yoke 243b disposed opposite thereto. In an example, the yoke 240 may include a fourth yoke 244 that is installed on an internal surface of a sidewall facing the other sidewall among sidewalls disposed to be inclined as viewed from above, and an external surface of the first movable body 220 disposed opposite thereto.

In other words, the yoke 240 may include first to fourth yokes 241, 242, 243, 244, and the first to fourth yokes 241, 242, 243, 244 may be disposed so that two thereof form a pair.

The coil 250 is installed on the yoke 240 which is installed on an internal surface of the fixed body 210. In an example, the coil 250 is installed on a 1-1 yoke 241a, a 2-1 yoke 242a, a 3-1 yoke 243a, and a 4-1 yoke 244a, which are installed on the internal surface of the fixed body 210, among the first to fourth yokes 241, 242, 243, and 244. That is, the coil 250 may include a first coil 251 installed on the 1-1 yoke 241a, a second coil 252 installed on the 2-1 yoke 242a, a third coil 253 installed on the 3-1 yoke 243a, and a fourth coil 254 installed on the 4-1 yoke 244a. When current is supplied to the coil 250, the first movable body 220 moves in the internal space of the fixed body 210 by reluctance force generated from the coil 250 and the yoke 240 formed of a magnetic material.

The elastic member 260 is connected to the fixed body 210 and the first movable body 220 to provide restorative force to the first movable body 220. In an example, the elastic member 260 is connected to a surface adjacent to the surface on which the coil 250 and the yoke 240 are installed. For example, the elastic member 260 may include a first elastic member 261 disposed adjacent to the first yoke 241 and the first coil 251, a second elastic member 262 disposed adjacent to the second yoke 242 and the second coil 252, a third elastic member 263 disposed adjacent to the third yoke 243 and the third coil 253, and a fourth elastic member 264 disposed adjacent to the fourth yoke 244 and the fourth coil 254. That is, the elastic member 260 may be alternately disposed with the coil 250. Accordingly, lengths of the fixed body 210 and the movable body 220 in an optical axis direction may be reduced. Additionally, in an example, the elastic member 260 may have both end portions connected to the fixed body 210 and a central portion connected to the first movable body 220.

In an example, the first to fourth elastic members 261 to 264 provide restorative force to return the first movable body 220 to an original position thereof when the current supplied to the coil 250 is cut off. For example, the elastic member 260 may be formed of a leaf spring, as only an example.

As described above, in the camera module 200, a method for driving the first movable body 220 using the force (reluctance force) generated by the yoke 240 and the coil 250 and the restorative force of the elastic member 260 formed of a leaf spring, is adopted. That is, when current is applied to the coil 250 installed on the fixed body 210, a magnetic field is formed in the coil 250, and the formed magnetic field generates force (Reluctance force) together with the yoke 240 installed on the first movable body 220. The yoke 240 installed on the first movable body 220 is drawn by this force, and accordingly, the first movable body 220 is moved. Thereafter, when the current is cut off, the elastic member 260 disposed adjacent to the yoke 240 and the coil 250 restores the first movable body 220 to an original position thereof. Accordingly, OIS driving of the image sensor 132 attached to the first movable body 220 may be performed. Accordingly, OIS driving of the image sensor 132 attached to the first movable body 220 may be performed.

As described above, since the camera module 200 does not use a permanent magnet, it is possible to remove an external interference phenomenon of the magnetic field due to the permanent magnet. Furthermore, since the coil 250 is installed on the yoke 240, there is a shielding effect against the magnetic flux leaking externally, and the reluctance force can be increased by reducing the magnetoresistance.

FIGS. 12 to 15 are illustrative views for illustrating a driving method of a camera module, in accordance with one or more embodiments.

Figure 12:
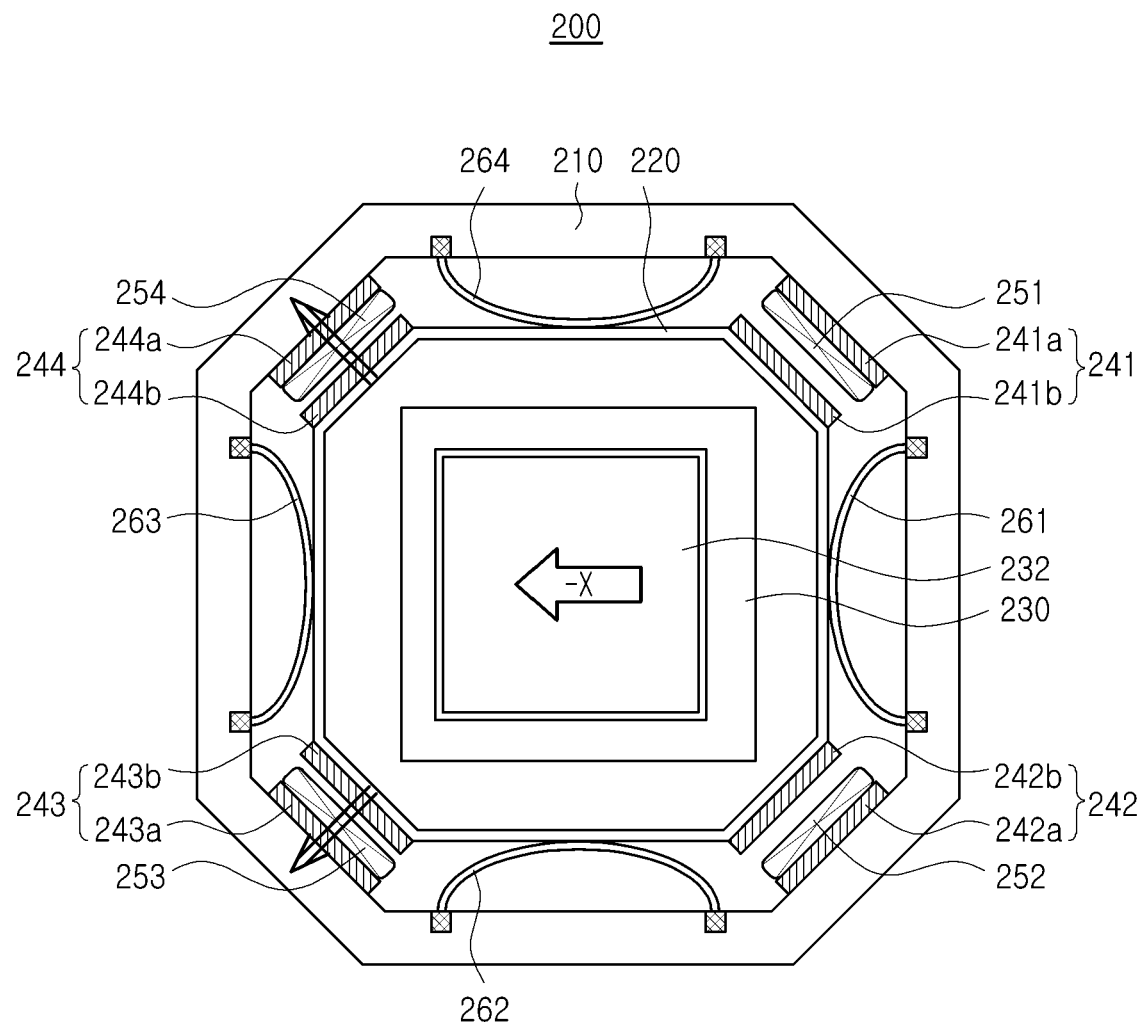
FIG. 12, FIG. 13, FIG. 14, and FIG. 15 are illustrative views for illustrating a driving method of an example camera module, in accordance with one or more embodiments.

First, as illustrated in FIG. 12, when a first movable body 220 moves in an −X axis direction, current is applied to a third coil 253 and a fourth coil 254. Accordingly, the first movable body 220 may move in the −X axis direction through force generated by the third coil 253, the third yoke 243, and the fourth yoke 244, and the fourth coil 254. Thereafter, when supply of current to the third coil 253 and the fourth coil 254 is cut off, the first movable body 220 returns to an original position thereof by restorative force of the first elastic member 261. In this example, restorative force of the second elastic member 262 and the fourth elastic member 264 may also be provided to the first movable body 220.

Figure 13:
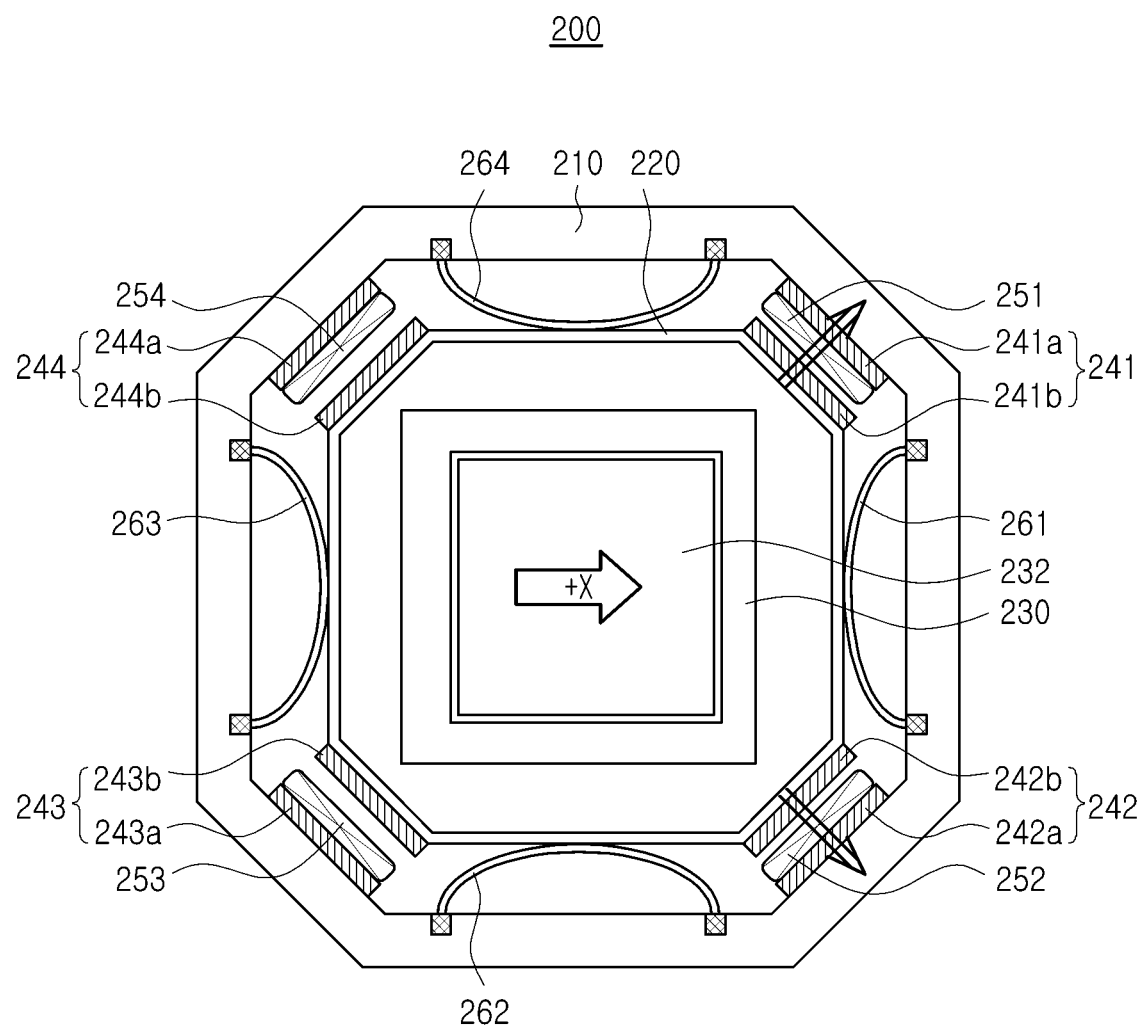

Additionally, as illustrated in FIG. 13, when the first movable body 220 moves in a +X axis direction, current is applied to the first coil 251 and the second coil 252. Accordingly, the first movable body 220 may move in the +X axis direction through force generated by the first yoke 251, the first coil 251, and the second yoke 242, and the second coil 252. Thereafter, when supply of current to the first coil 251 and the second coil 252 is cut off, the first movable body 220 returns to an original position thereof by restorative force of the third elastic member 263. In this example, restorative force of the second elastic member 262 and the fourth elastic member 264 may also be provided to the first movable body 220.

Figure 14:
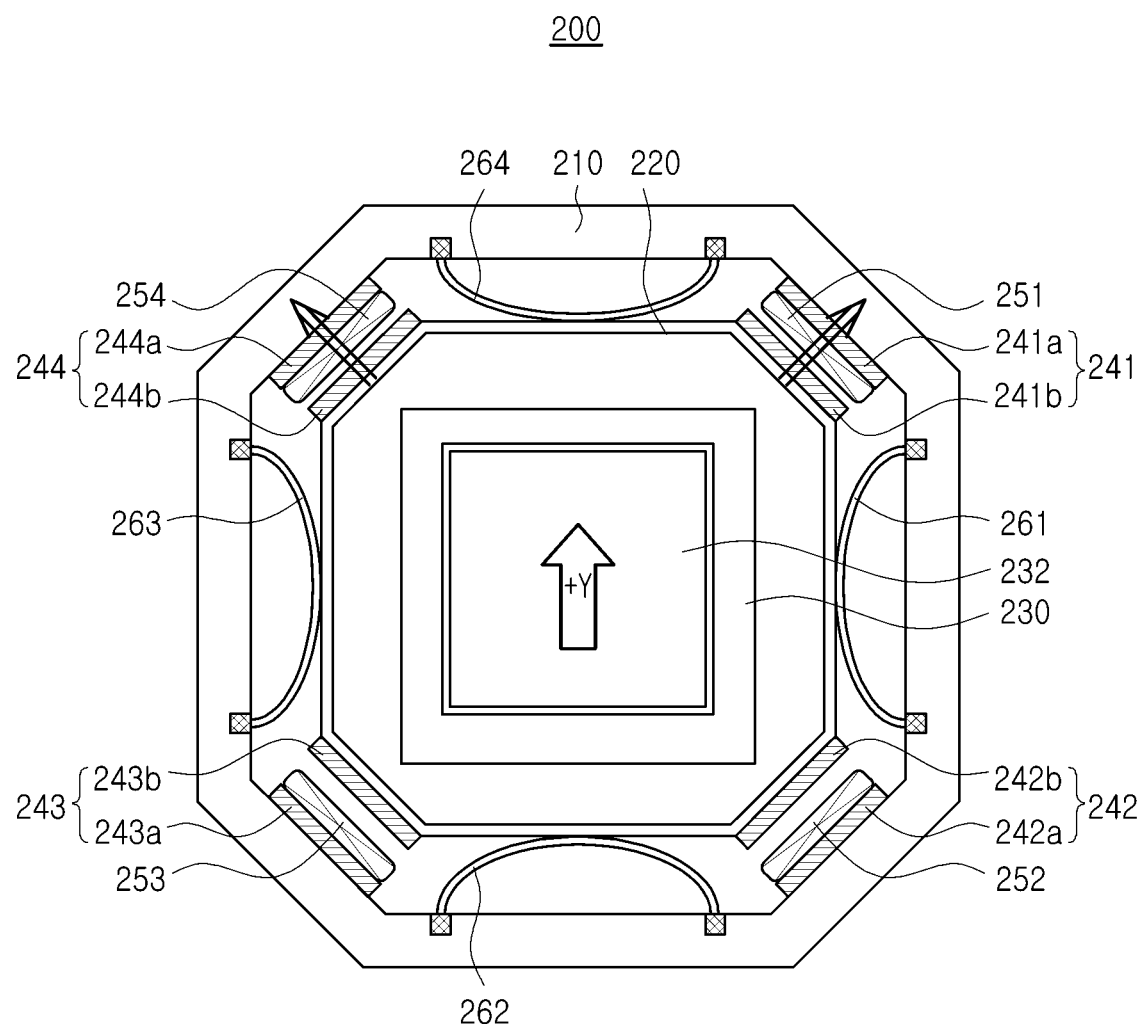

As illustrated in FIG. 14, when the first movable body 220 moves in a +Y axis direction, current is applied to the first coil 251 and the fourth coil 254. Accordingly, the first movable body 220 may move in the +Y axis direction through force generated by the first yoke 241, the first coil 251, the fourth yoke 244, and the fourth coil 254. Thereafter, when supply of current to the first coil 151 and the fourth coil 254 is cut off, the first movable body 220 returns to an original position thereof by restorative force of the second elastic member 162. In this example, restorative force of the first elastic member 261 and the third elastic member 263 may also be provided to the first movable body 220.

Figure 15:
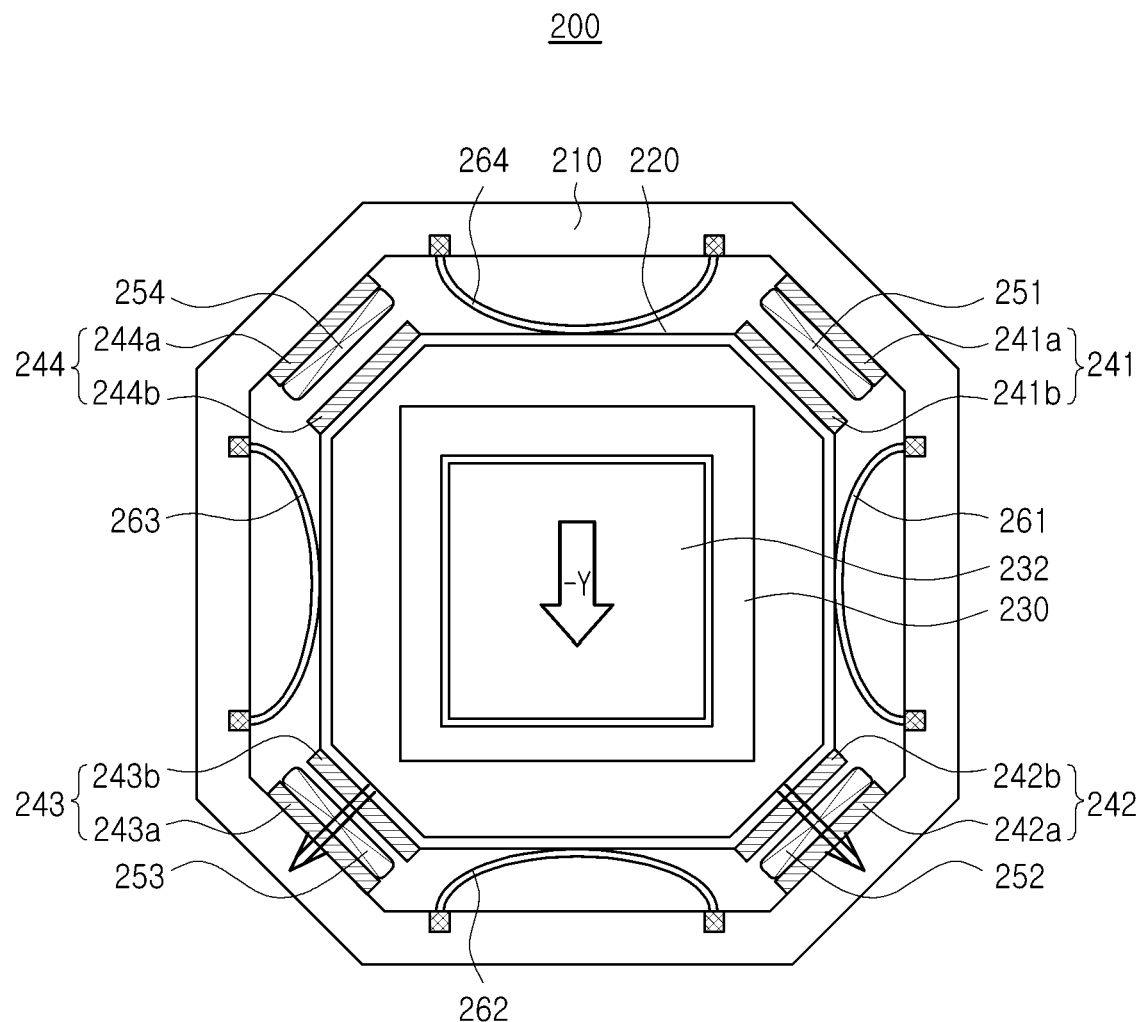

Additionally, as illustrated in FIG. 15, when the first movable body 120 moves in a −Y axis direction, current is applied to the second coil 252 and the third coil 253. Accordingly, the first movable body 220 moves in the −Y axis direction through forces generated by the second yoke 242, the second coil 252, the third yoke 243, and the third coil 253. Thereafter, when supply of current to the second coil 252 and the third coil 253 is cut off, the first movable body 220 returns to an original position thereof by restorative force of the fourth elastic member 264. In this example, restorative force of the first elastic member 261 and the third elastic member 263 may also be provided to the first movable body 220.

Figure 16:
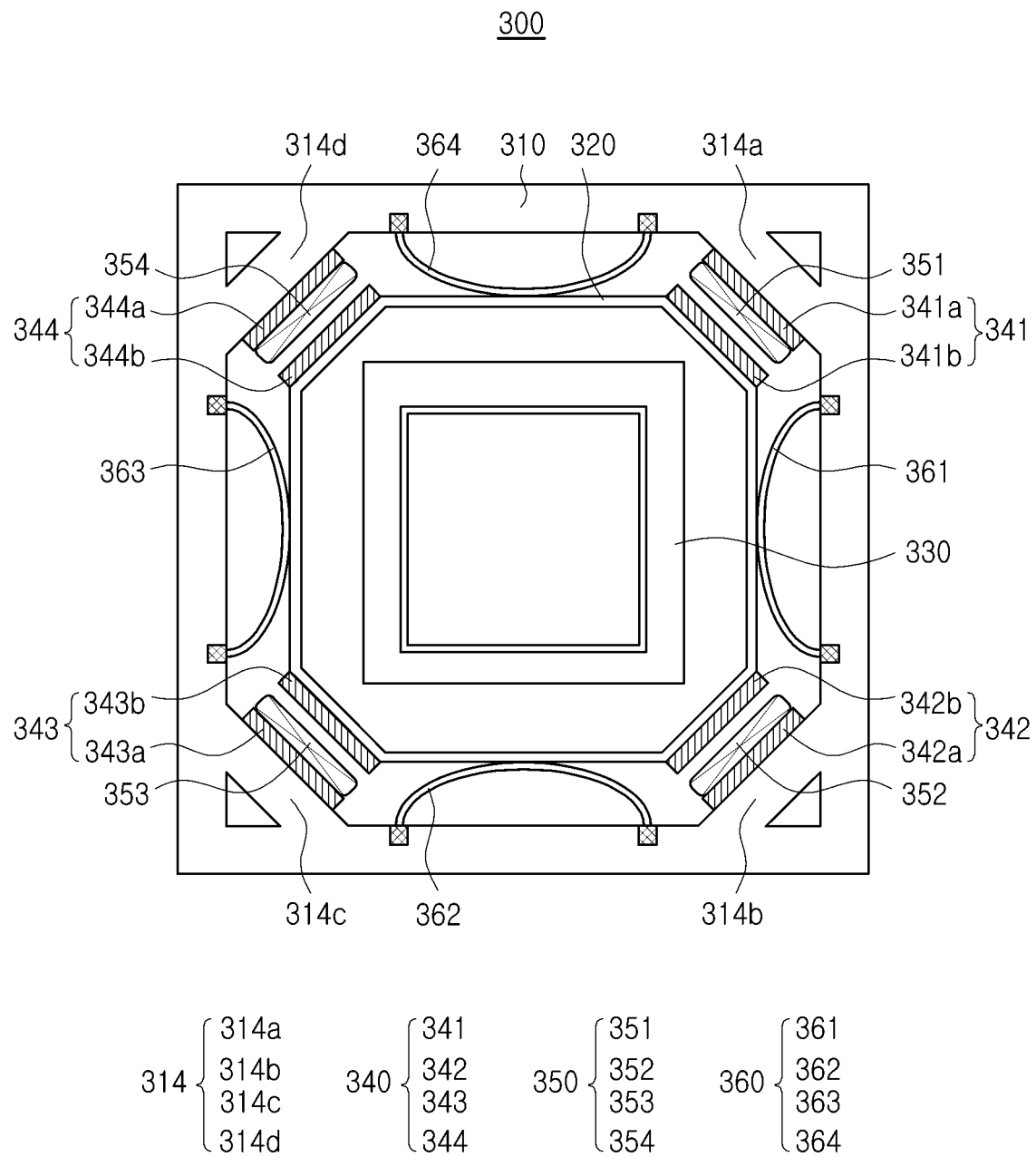
FIG. 16 is a plan view of a main configuration disposed at a lower end of an example camera module according to a modified embodiment as viewed from above

FIG. 16 illustrates a plan view of a main configuration disposed at a lower end of an example camera module according to a modified embodiment as viewed from above.

Referring to FIG. 16, in an example, a camera module 300 may be configured to include a fixed body 310, a first movable body 320, a substrate 330, a yoke 340, a coil 350, an elastic member 360, and a ball member 170 (see FIG. 2).

In an example, since the substrate 130 and the ball member 170 are substantially the same as the components described above, a detailed description thereof will be omitted and will be replaced with the above description.

The fixed body 310 has an internal space. In an example, the fixed body 310 may have a rectangular parallelepiped shape with an open upper portion. That is, a sidewall of the fixed body 310 may have a rectangular frame shape as viewed from above. In an example, a yoke 340 may be installed at a lower end of the fixed body 310. Additionally, a coil 350 may be fixedly installed on the yoke 340 installed at the lower end of the fixed body 310. A detailed description thereof will be provided later. Additionally, an elastic member 360 may be connected to an internal surface of the sidewall of the fixed body 310. In this example, the elastic member 360 may be disposed below the yoke 340. A detailed description thereof will also be provided later. In an example, the fixed body 310 may be provided with an installation portion 314 disposed on a side of four edges of the fixed body. As an example, the four installation portions 314 may be disposed on the side of four edges of the fixed body 310, and may include first to fourth installation portions 314a, 314b, 314c, and 314d.

The first movable body 320 is movably installed on the fixed body 310. A sidewall of the first movable body 320 may have an octagonal frame shape as viewed from above. Meanwhile, a yoke 340 may be installed on an external surface of the sidewall of the first movable body 320 to face the yoke 340 installed at a lower end of the fixed body 210. A detailed description thereof will be provided later.

Additionally, an elastic member 360 may be connected to the external surface of the sidewall of the first movable body 320. In this example, the elastic member 360 may be disposed adjacent to the yoke 340. A detailed description thereof will also be provided later.

The yoke 340 is installed on the fixed body 310 and the first movable body 320 to face each other. In an example, four pairs of yokes 340 may be installed in an installation portion 314 of the fixed body 310 and the first movable body 320. For example, the yoke 340 may include a first yoke 341 installed on an external surface of a first installation portion 314a, among four installation portions 314 of the fixed body 310, and a first movable body 320, disposed to be opposite thereto, wherein the first yoke 341 may include a 1-1 yoke 341a installed on an internal surface of the first installation portion 314a of the fixed body 310, and a 1-2 yoke 341b disposed opposite thereto. Additionally, the yoke 340 may include a second yoke 342 installed on an external surface of a second installation portion 314b among four installation portions 314, and a first movable body 320 disposed opposite thereto, wherein the second yoke 342 may include a 2-1 yoke 342a installed on an internal surface of the second installation portion 314b of the fixed body 310 and a 2-2 yoke 342b, disposed opposite thereto. Furthermore, the yoke 340 may include a third yoke 343 installed on an internal surface of a third installation portion 314c of the fixed body 310 and an external surface of the first movable body 320 disposed opposite thereto, wherein the third yoke 343 may include a 3-1 yoke 343a installed on an internal surface of the fixed body 310 and a 3-2 yoke 343b disposed opposite thereto. In an example, the yoke 340 may include a fourth yoke 344 installed on an internal surface of a fourth installation portion 314d of the fixed body 310 and an external surface of the first movable body 320 disposed opposite thereto, wherein the fourth yoke 344 may include a 4-1 yoke 344a installed on an internal surface of the fixed body 310 and a 4-2 yoke 344b disposed opposite thereto.

In other words, the yoke 340 may include first to fourth yokes 341, 342, 343, and 344, and the first to fourth yokes 341, 342, 343 and 344 may be disposed so that two thereof form a pair.

The coil 350 is installed on the yoke 340 installed on an internal surface of the fixed body 310. As an example, the coil 350 is installed on a 1-1 yoke 341a, a 2-1 yoke 342a, a 3-1 yoke 343a, and a 4-1 yoke 344a, installed on the internal surface of the fixed body 310 among the first to fourth yokes 341, 342, 343, and 344. That is, the coil 350 may include a first coil 351 installed on the 1-1 yoke 341a, a second coil 352 installed on the 2-1 yoke 342a, a third coil 353 installed on the 3-1 yoke, and a fourth coil 354 installed on the 4-1 yoke 344a. When current is supplied to the coil 350, the first movable body 320 moves in the internal space of the fixed body 310 by force (reluctance force) generated by the coil 350 and the yoke 340 formed of a magnetic material.

The elastic member 360 is connected to the fixed body 310 and the first movable body 320 to provide restorative force to the first movable body 320. As an example, the elastic member 360 is connected to a surface adjacent to the surface on which the coil 350 and the yoke 340 are installed. For example, the elastic member 360 may include a first elastic member 361, disposed adjacent to the first yoke 341 and the first coil 351, a second elastic member 362, disposed adjacent to the second yoke 342 and the first coil 352, a third elastic member 363, disposed adjacent to the third yoke 343 and the third coil 353, and a fourth elastic member 364, disposed adjacent to the fourth yoke 344 and the fourth coil 354. That is, the elastic member 360 may be alternately disposed with the coil 350. Accordingly, lengths of the fixed body 310 and the movable body 320 in an optical axis direction may be reduced. Also, as an example, the elastic member 360 may have both end portions connected to the fixed body 310 and a central portion connected to the first movable body 320.

In an example, the first to fourth elastic members 361 to 364 provide restorative force to return the first movable body 320 to an original position thereof when a current supplied to the coil 350 is cut off. For example, the elastic member 360 may be formed of a leaf spring, as only an example.

Figure 17:
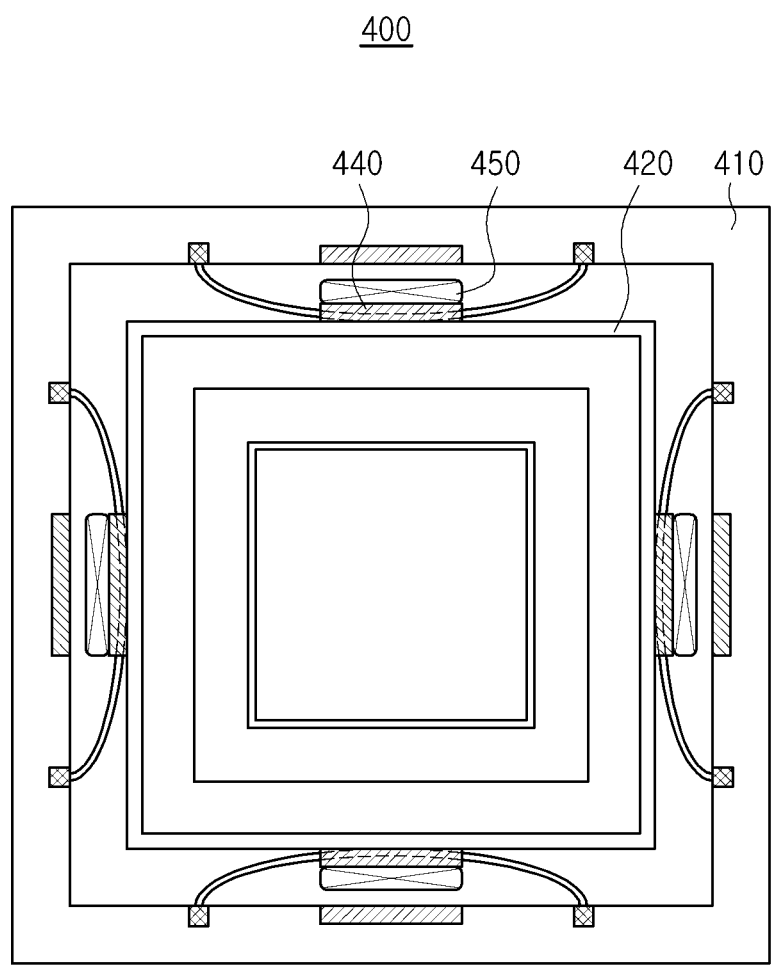
FIG. 17 is a plan view of a main configuration disposed at a lower end of the example camera module according to a modified embodiment as viewed from above.

FIG. 17 is a plan view of a main configuration disposed at a lower end of an example camera module according to a modified embodiment as viewed from above.

Referring to FIG. 17, a camera module 400 has substantially the same configuration as the configuration provided in the camera module 100 illustrated in FIGS. 2 to 5, except that a coil 450 is installed on a yoke 410 installed on a first movable body 420.

Figure 18:
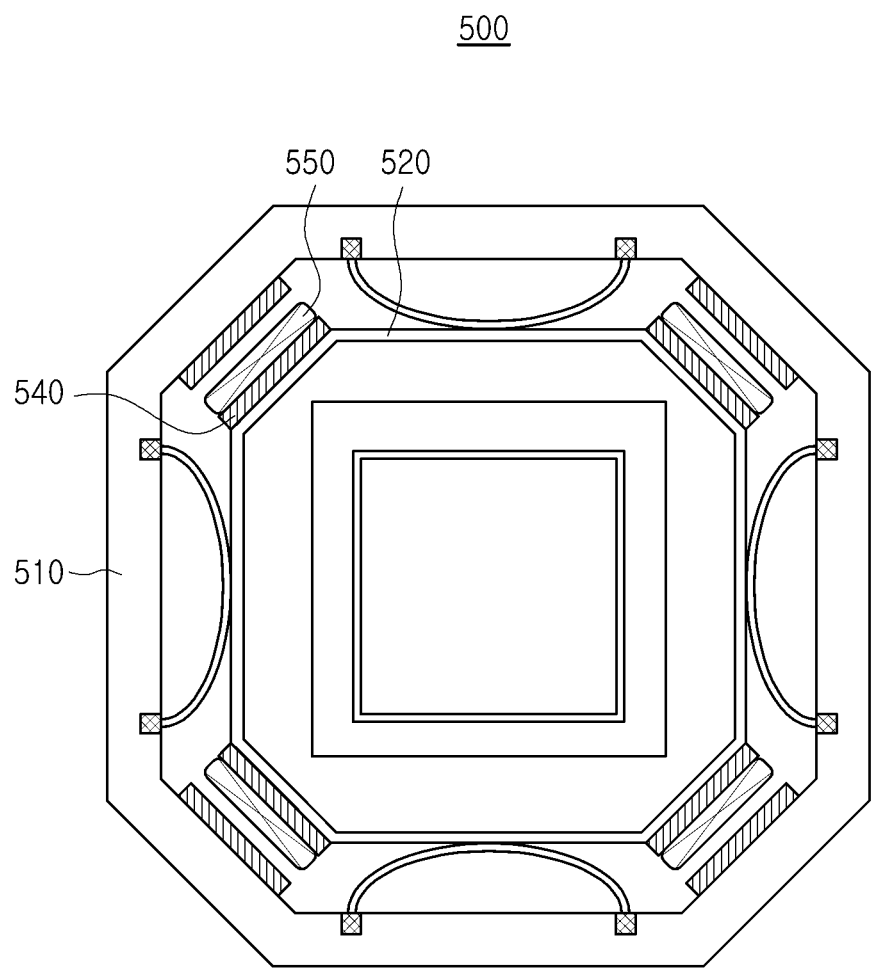
FIG. 18 is a plan view of a main configuration disposed at a lower end of an example camera module according to a modified embodiment as viewed from above.

FIG. 18 is a plan view of a main configuration disposed at a lower end of a camera module according to a modified embodiment as viewed from above.

Referring to FIG. 18, a camera module 500 has substantially the same configuration as the configuration provided in the camera module 200 illustrated in FIGS. 10 and 11, except that a coil 550 is installed on a yoke 510 installed on a first movable body 520.

As set forth above, according to the one or more examples, there is an effect of preventing a tilt from occurring in a driving body.

As set forth above, according to the one or more examples, it is possible to prevent magnetic flux from leaking.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a fixed body having an internal space;
a first movable body movably disposed on the fixed body in the internal space of the fixed body;
a substrate disposed on the first movable body;
an image sensor disposed on the substrate;
a yoke disposed on one of the fixed body and the first movable body;
a coil disposed on another one of the fixed body and the first movable body so that the coil faces the yoke disposed on the one of the fixed body and the first movable body;
an elastic member connected to the fixed body and the first movable body and configured to apply a restorative force to the first movable body; and
at least one ball member disposed to support the image sensor in an optical axis direction of the camera module,
wherein the yoke is disposed on a surface of the one of the fixed body and the first movable body, and
the elastic member is connected to the surface of the one of the fixed body and the first movable body on which the yoke is disposed.

2. The camera module of claim 1, wherein the elastic member is a leaf spring.

3. The camera module of claim 1, wherein the at least one ball member is disposed between the fixed body and the first movable body and is in contact with the first movable body.

4. The camera module of claim 3, wherein a surface of the fixed body facing a surface of the first movable body comprises a first groove in which the at least one ball member is disposed,
a surface of the first movable body facing the surface of the fixed body comprises a second groove in which the at least one ball member is disposed, and
the first groove in the surface of the fixed body and the second groove in the surface of the first movable body extend in respective directions intersecting each other.

5. The camera module of claim 1, wherein the coil is configured to generate a magnetic field in response to power being supplied to the coil, and
the yoke comprises a soft magnetic material that is magnetizable by the magnetic field generated by the coil.

6. The camera module of claim 1, wherein the yoke is disposed on the first movable body and the coil is disposed on the fixed body, and
the camera module further comprises another yoke disposed on the fixed body so that the other yoke faces the coil.

7. The camera module of claim 1, wherein the yoke is disposed on the fixed body and the coil is disposed on the first movable body, and
the camera module further comprises another yoke disposed on the first movable body so the other yoke faces the coil.

8. A camera module comprising:
a fixed body having an internal space;
a first movable body movably disposed on the fixed body in the internal space of the fixed body;
a substrate disposed on the first movable body;
an image sensor disposed on the substrate;
a yoke disposed on the fixed body and the first movable body;
a coil disposed on one of the fixed body and the first movable body so that the coil faces the yoke disposed on the fixed body and the first movable body; and
an elastic member connected to the fixed body and the first movable body and configured to apply a restorative force to the first movable body; and
at least one ball member disposed to support the image sensor in an optical axis direction of the camera module,
wherein the yoke comprises four pairs of yokes,
the coil comprises four coils,
one yoke of each pair of the four pairs of yokes is disposed on the fixed body, and another yoke of each pair of the four pairs of yokes is disposed on the first movable body, and
each coil of the four coils is disposed on the one yoke or the other yoke of a respective pair of the four pairs of yokes.

9. The camera module of claim 8, wherein a sidewall of the fixed body and a sidewall of the first movable body each have a rectangular frame shape when viewed in the optical axis direction,
the one yoke of each pair of the four pairs of yokes is disposed on an internal surface of the sidewall of the fixed body facing an external surface of the sidewall of the first movable body, and
the other yoke of each pair of the four pairs of yokes is disposed on the external surface of the sidewall of the first movable body facing the internal surface of the sidewall of the fixed body.

10. The camera module of claim 9, wherein the elastic member is disposed below the yoke and the coil in the optical axis direction.

11. The camera module of claim 10, wherein the elastic member comprises four elastic members, and
each elastic member of the four elastic members is connected to the internal surface of the sidewall of the fixed body on which the one yoke of each pair of the four pairs of yokes is disposed, and is connected to the external surface of the sidewall of the first movable body on which the other yoke of each pair of the four pairs of yokes is disposed.

12. The camera module of claim 8, wherein a sidewall of the fixed body and a sidewall of the first movable body each have an octagonal frame shape when viewed in the optical axis direction, and
each coil of the four coils faces the one yoke and the other yoke of the respective pair of the four pairs of yokes in a diagonal direction of the image sensor when viewed in the optical axis direction.

13. The camera module of claim 12, wherein the image sensor has a rectangular shape having four sides when viewed in the optical axis direction,
the sidewall of the fixed body and the sidewall of the first movable body each have a first section, a second section, a third section, a fourth section, a fifth section, a sixth section, a seventh section, and an eighth section sequentially arranged in a circumferential direction of the fixed body and a circumferential direction of the first movable body when viewed in the optical axis direction, with the first, third, fifth, and seventh sections of the fixed body and the first movable body being parallel to the four sides of the image sensor, the elastic member comprises four elastic members, the four elastic members are respectively connected to internal surfaces of the first, third, fifth, and seventh sections of the fixed body and to external surface of the first, third, fifth, and seventh sections of the first movable body, the one yokes of the four pairs of yokes are respectively disposed on internal surfaces of the second, fourth, sixth, and eighth sections of the fixed body, and the other yokes of the four pairs of yokes are respectively disposed on external surfaces of the second, fourth, sixth, and eighth sections of the first movable body.

14. The camera module of claim 8, wherein a sidewall of the fixed body has a rectangular frame shape when viewed in the optical axis direction, the fixed body comprises four installation portions disposed adjacent to four corners of the sidewall of the fixed body having the rectangular frame shape, a sidewall of the first movable body has an octagonal frame shape when viewed in the optical axis direction, and the one yokes of the four pairs of yokes are respectively disposed on internal surfaces of the four installation portions.

15. The camera module of claim 14, wherein the elastic member is comprises four elastic members respectively connected to internal surfaces of four sections of the sidewall of the fixed body between the four installation portions, and respectively connected to external surfaces of four sections of the sidewall of the first movable body facing the four sections of the sidewall of the fixed body.

16. An apparatus comprising:
a camera module comprising:
 a fixed body;
 a movable body;
 an image sensor disposed on the movable body; and
 an actuator configured to move the movable body and the image sensor disposed thereon relative to the fixed body in a direction perpendicular to an optical axis of the camera module,
wherein the actuator comprises:
 first yokes disposed on an inner wall of the fixed body;
 second yokes disposed on an outer wall of the movable body so that the second yokes face the first yokes;
 coils disposed on the first yokes so that the coils face the second yokes, or disposed on the second yokes so that the coils face the first yokes; and
 elastic members connected to the inner wall of the fixed body and the outer wall of the movable body and configured to apply a force to the movable body.

17. The apparatus of claim 16, further comprising a ball member disposed in contact with a surface of the fixed body and a surface of the movable body to support the movable body and the image sensor disposed thereon.

18. The apparatus of claim 16, wherein the elastic members are connected to surfaces of the inner wall of the fixed body that are adjacent to surfaces of the inner wall of the fixed body on which the first yokes are disposed, and is connected to surfaces of the outer wall of the movable body that are adjacent to surfaces of the outer wall of the movable body on which the second yokes are disposed.

19. The apparatus of claim 16, wherein the elastic members are springs.

* * * * *